United States Patent Office 3,434,786
Patented Mar. 25, 1969

3,434,786
DUAL-BEAM POLARISCOPE
Paul D. Flynn, Arthur A. Roll and Joseph T. Gilbert, Philadelphia, Pa., assignors to the United States of America as represented by the Secretary of the Army
Continuation-in-part of application Ser. No. 277,426, Apr. 30, 1963. This application Feb. 3, 1967, Ser. No. 638,161
Int. Cl. G01b 11/18
U.S. Cl. 356—33                    2 Claims

ABSTRACT OF THE DISCLOSURE

Dual-beam polariscope arrangements are provided for purposes of obtaining photoelastic stress analyses of transparent models under dynamic and static loading conditions. The polariscope arrangements embody separate light beam transmitting means through corresponding condenser lenses and polarizers, a transparent model where the light beams intersect in a predetermined manner, and corresponding analyzers. The respective light beams are collected via a plurality of mirrors in such a manner that specimen stress viewing is obtained by a camera and its lens whose single adjustment focuses both images.

---

This application is a continuation-in-part of applicant's co-pending application, Ser. No. 277,426, filed Apr. 30, 1963.

This invention relates to polariscopes and more particularly, to a dual-beam polariscope for determining stress distributions in photoelastic models under dynamic and static loading conditions.

It is well-known that many transparent isotropic solids exhibit a phenomenon known as the photoelastic effect, i.e., they undergo certain changes in optical properties when subjected to stresses. For example, a block of glass will exhibit temporary birefringence or double refraction when put under tension or compression. If the block is placed in a field of polarized white light, the field will remain unchanged so long as the glass is in no-load condition, but as stress is applied, colored fringes appear. This principle has been adapted to the study of stresses in photoelastic models of structural parts and an instrument known as a polariscope is commonly employed in such work.

In the application of photoelasticity, a useful technique has been the so-called "method of oblique incidence." This method is employed for separating principal stresses and involves repeated tests, usually one at normal incidence and the other at oblique incidence. Heretofore, in the employment of this technique, an ordinary polariscope of the single-beam type has been utilized. However, results obtained have proved none too reliable because of errors due to lack of reproducibility in loading and inaccuracies in determining corresponding times when an explosive loading system is employed.

Accordingly, a principle object of the present invention is to provide an improved polariscope arrangement, the use of which is unattended by the aforementioned disadvantages of the prior art.

Another object of the invention is to provide a dual-beam polariscope capable of obtaining independent, simultaneous views of a photoelastic model.

Still another object of the invention is to provide such a dual-beam polariscope capable of obtaining simultaneous normal and oblique incidence views of a photoelastic model.

Other objects of the invention will in part be obvious and in part appear hereinafter in the following detailed description and accompanying drawings, wherein.

In accordance with the present invention the problem of obtaining normal and oblique incidence views of a photoelastic model which are free from the disadvantages attendant the use of a single-beam polariscope, i.e., errors due to lack of reproducibility in loading and inaccuracies in determining coresponding times when a dynamic loading system is employed, is solved by the use of a dual-beam polariscope. This invention permits the obtention of simultaneous normal and oblique incidence photoelastic stress patterns, thereby eliminating any possible errors due to repeated tests. The polariscopes in conjunction with suitable cameras or viewing systems may be used to study stresses in two-dimensional models of photoelastic materials subjected to either dynamic or static loads.

In each arrangement two single-beam polariscopes with intersecting light beams are provided in conjunction with a system of mirrors for putting projected images into a single camera.

Figure 1:
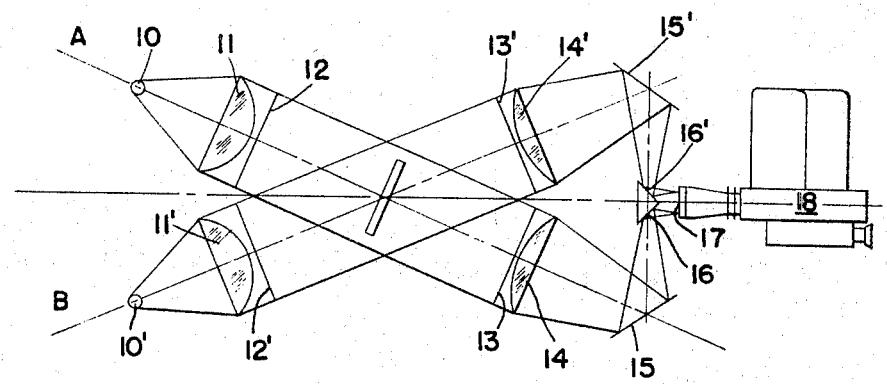
FIG. 1 is a top plan view of a dual-beam polariscope arrangement embodying the principles of the invention.

A fuller understanding of the invention may be had by recourse first to FIG. 1 which schematically illustrates the inventive dual-beam polariscope. Optical paths A and B represent the paths of normal incidence and oblique incidence, respectively. Along each of these paths, light sources 10 and 10', placed at the focal points of condenser lenses 11 and 11', respectively, emit light beams which are transmitted through said lenses giving a collimated field having an efficient use of the available light. The light beams pass through corresponding polarizers 12 and 12' and analyzers 13 and 13', before being converged by corresponding collector lenses 14 and 14' onto large mirrors 15 and 15' respectively. Reflected light from the latter continues to converge onto small mirrors 16 and 16', respectively, which in turn reflect the light into camera lens 17 of camera 18. When normal incidence exists with respect to the transparent model, light beam A is transmitted unidirectionally or parallel therethrough from polarizer 12 to analyzer 13, so as to transmit the light beam in a manner without refraction as well as reflection between polarizer 12 and analyzer 13.

In order to obtain a uniform field, large mirrors 15 and 15' and small mirrors 16 and 16' are adjusted so that camera lens 17 may be placed in the common focal plane of collector lenses 14 and 14', camera lens 17 being chosen so that light beams from both optical paths A and B can be received and so that the image from each beam will fill one-half the available frame in camera 18. Significantly, the corresponding distances along the respective light beams between the camera and the mean point of light beam intersection M being equal to each other, so that a single adjustment of the camera lens 17 will simultaneously bring both images of the light beams into focus.

Figure 2:
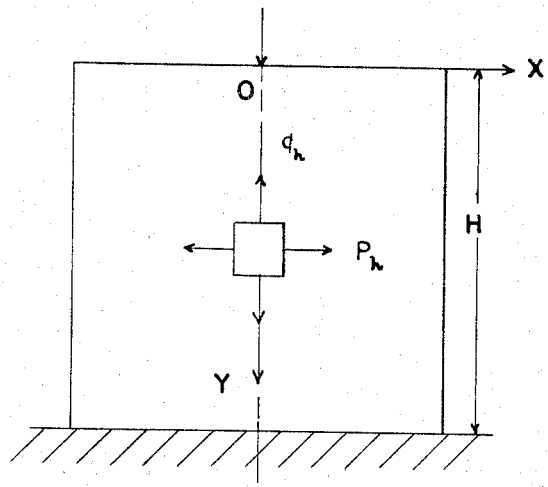
FIG. 2 shows a diagram of the photoelastic test model under load in the FIG. 1 arrangement.

Loading of the photoelastic test model is schematically shown in FIG. 2, which depicts a model (for illustrative purposes a square configuration of H height) with a load acting in the direction of the line of stress symmetry. The point at which the load is applied is indicated as O and if this point is taken as the origin of a rectangular Cartesian coordinate system, then the horizontal axis is represented by X and the vertical axis is represented by Y. The horizontal and vertical principal stresses in fringe units on the line of stress symmetry are denoted by $p_n$ and $q_n$, respectively.

In the arrangement of FIG. 1 the light source employed for each optical path or beam was a direct current (7.3 amps, 220 volts), small arc (4.5 x 2.3 mm.), 500 watt mercury lamp 10, 10′ which operated in series with a ballast resistor (22 ohms). The condenser and collector lenses had diameters of 8 inches each and focal lengths of 9 inches and 18 inches, respectively, and were made of plastic. The polarizers and analyzers preferably are rotatably mounted and may be made from a sheet of plastic laminated circular polarizer or independent plane polarizers and quarter-wave plates.

In conjunction with the FIG. 1 dual-beam polariscope a highs-speed 16 mm., rotating prism, motion-picture camera equipped with a 0.003 inch slit aperture plate was used. The slit decreased the exposure time and also reduced the frame height. For typical operating conditions of 7500 pictures per second, the effective shutter speed was 1.3 microseconds and the interval between pictures was 133 microseconds. The use of the slit aperture plate in a rotating prism camera, such as that employed, for the purpose of reducing the effective shutter speed, is analogous to the operation of a focal plane shutter in an ordinary camera. The picture is not photographed all at once, and at a speed of 7500 pictures per second, a period of 56 microseconds is required to record the full frame.

Tests with explosive loads were carried out using a metal firing box equipped with safety glass windows. Electric primers were used in a firing head assembly and the blast therefrom was transmitted directly to the model through a hole in an end-piece of the assembly, a slot in the end-piece being used to distribute the load across the thickness of the model in order to obtain plane loading.

Steel rods were used in mechanical impact tests. The mechanical loading system consisted of a platform to support the model and a vertical ball bushing to guide the impact rod. Also static loads were applied by means of dead weights acting through a guided plunger.

Figure 3:
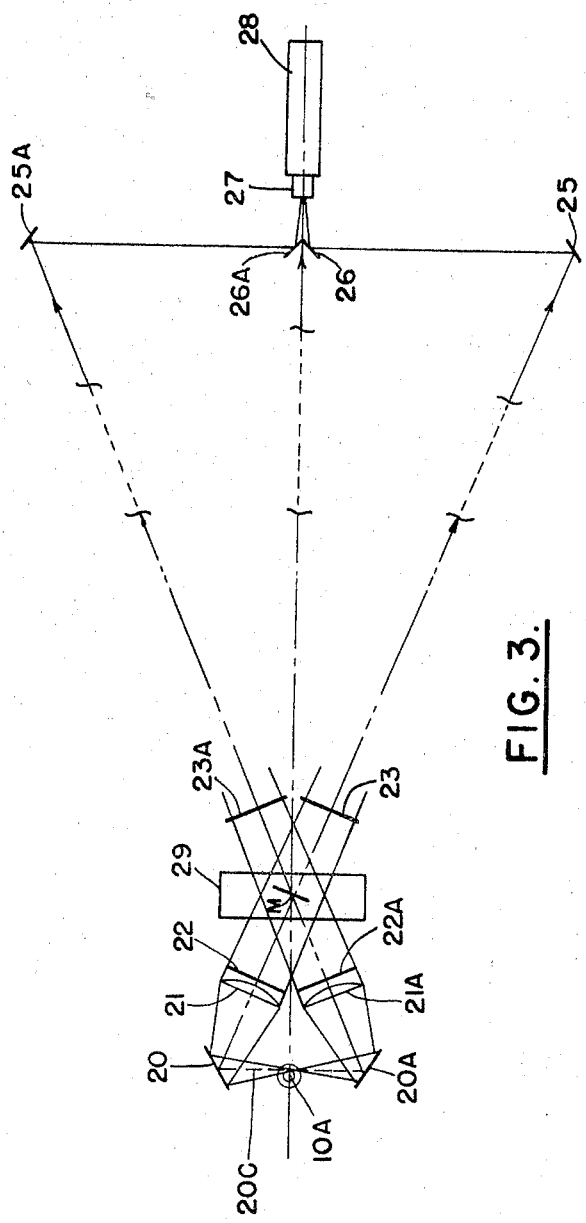
FIG. 3 is a top plan view of a modified dual-beam polariscope arrangement.

In the modified arrangement of FIG. 3, a single lamp 10A is employed with a pair of suitably oriented mirrors 20 and 20A. The lamp may have a small arc and approximate a point source, or it may have an extended element such as a helical coil in a xenon flashtube. It may be advantageous to utilize the illumination from peripheral portions, especially in the latter case as shown schematically in FIG. 3, by offsetting the center of lamp 10A from the centerline 20C of mirrors 20, 20A. The remainder of the FIG. 3 dual-beam polariscope arrangement is generally the same as that in FIG. 1, except for the fact that collector lenses have been omitted and condenser lenses 21, 21A are selected and adjusted so as to transmit slightly converging light rays within each beam through the corresponding rotatably mounted polarizers 22, 22A, through the transparent model rotatably positioned within the firing box 29 at the mean point of light beam intersection M, upon the respective rotatably mounted analyzers 23, 23A and corresponding mirrors 25, 25A, 26, 26A for reflection into lens 27 whose single adjustment focuses both images at the film plane of camera 28.

In conjunction with the FIG. 3 dual-beam polariscope, a high-speed framing camera has been used at rates up to 1,000,000 frames per second to obtain simultaneous normal and oblique incidence dynamic stress patterns of wave propagation in various photoelectric models subjected to explosive loads.

It will be further understood that various changes may be made in the disclosed arrangements without departing from the spirit and scope of the invention as defined by the appended claims.

We claim:
1. A dual-beam polariscope arrangement comprising: means providing a pair of light beams,
   a transparent model,
   a first non-reflective light beam transmitting means, including a condenser lens, a polarizer and an analyzer, arranged substantially at normal incidence to said model, said model being located in the transmitted light beam intermediate said polarizer and analyzer,
   a second non-reflective light beam transmitting means, including a condenser lens, a polarizer and an analyzer, arranged at an oblique incidence to said model, said model being located in the second transmitted light beam intermediate said second polarizer and analyzer,
   a camera having an adjustable lens for simultaneously viewing photoelastic stress patterns produced by said light beams passing through the corresponding polarizers, model and corresponding analyzers, and
   mirror means positioned between said camera lens and each of said analyzers for reflecting each of said light beams from said analyzers upon portions of said camera lens.
2. The structure of claim 1 wherein center lines of said transmitted light beams intersect each other at said model and the corresponding distances along the respective light beams between said camera lens and said light beam intersection are equal to each other.

References Cited

UNITED STATES PATENTS

| | | |
|---|---|---|
| 3,292,484 | 12/1966 | Clay. |
| 3,178,934 | 4/1965 | O'Reagan. |
| 3,096,175 | 7/1963 | Zandman. |
| 2,992,589 | 7/1961 | Williams. |
| 2,736,250 | 2/1956 | Papritz _____ 95—18 |
| 3,187,623 | 6/1965 | Zandman. |

FOREIGN PATENTS

| | | |
|---|---|---|
| 1,138,768 | 2/1957 | France. |

JEWELL H. PEDERSEN, *Primary Examiner.*

A. A. KASHINSKI, *Assistant Examiner.*